US008013232B2

(12) United States Patent
Hara

(10) Patent No.: US 8,013,232 B2
(45) Date of Patent: Sep. 6, 2011

(54) MUSIC SESSION SYSTEM, MUSIC SESSION SYSTEM SERVER, AND PROGRAM FOR IMPLEMENTING METHOD OF CONTROLLING THE SERVER

(75) Inventor: Takahiro Hara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/585,719

(22) Filed: Oct. 23, 2006

(65) Prior Publication Data

US 2007/0089593 A1 Apr. 26, 2007

(30) Foreign Application Priority Data

Oct. 25, 2005 (JP) ................................ 2005-310543

(51) Int. Cl.
*G10H 7/00* (2006.01)
*G09B 15/00* (2006.01)

(52) U.S. Cl. ............ 84/645; 84/602; 84/634; 84/470 R; 84/477 R

(58) Field of Classification Search .................... 84/645, 84/465–469, 470 R, 471 R, 472, 477 R, 600, 84/670, 723–734, 105, 107, 112–114, 169
See application file for complete search history.

(56) References Cited

U.S. PATENT DOCUMENTS 6,084,168 A * 7/2000 Sitrick ........................ 84/477 R
6,423,893 B1 * 7/2002 Sung et al. ...................... 84/645
6,426,455 B2 * 7/2002 Hasegawa .................. 84/470 R
6,482,087 B1 * 11/2002 Egozy et al. ..................... 463/7
6,598,074 B1 * 7/2003 Moller et al. ................ 709/204
6,660,922 B1 * 12/2003 Roeder ....................... 84/477 R
6,751,439 B2 * 6/2004 Tice et al. ..................... 434/350
6,936,758 B2 * 8/2005 Itoh ............................ 84/470 R
2001/0007960 A1 * 7/2001 Yoshihara et al. ............. 700/94
2001/0056375 A1 * 12/2001 Kunii ............................. 705/14
2002/0144586 A1 * 10/2002 Connick, Jr. .................... 84/478
2002/0165921 A1 * 11/2002 Sapieyevski .................. 709/204
2003/0056637 A1 * 3/2003 Hasegawa ....................... 84/609
2003/0110926 A1 * 6/2003 Sitrick et al. ................ 84/477 R
2005/0120865 A1 * 6/2005 Tada .............................. 84/600

FOREIGN PATENT DOCUMENTS

JP 11-308568 A 11/1999
JP 11-313279 A 11/1999
JP 2003-256552 A 9/2003
JP 2004-233765 A 8/2004
JP 2004-248874 A 9/2004
JP 2005-165078 6/2005
JP 2005-195982 A 7/2005

* cited by examiner

*Primary Examiner* — Elvin G Enad
*Assistant Examiner* — Christopher Uhlir
(74) *Attorney, Agent, or Firm* — Morrison & Foerster LLP

(57) ABSTRACT

A music session system which makes it possible to expand the functions of electronic musical apparatuses. The server is connected to a first electronic musical apparatus belonging to a first user and capable of executing music sessions, a first personal computer (PC) belonging to the first user and capable of executing additional functions, a second electronic musical apparatus belonging to a second user and capable of executing music sessions, and a second PC belonging to the second user and capable of executing additional functions via a network so as to perform transmission and reception of information to and from these apparatuses. When the first electronic musical apparatus requests the apparatuses belonging to the second user to execute a music session and an additional function, the first and second electronic musical apparatuses are instructed to execute the music session, and the first and second PCs are instructed to execute the additional function.

12 Claims, 6 Drawing Sheets

| USER ID | IP ADDRESS | DEVICE INFORMATION 1 | DEVICE INFORMATION 2 | ... |
|---|---|---|---|---|
| A(TARO) | xxx.xxx.xxx.xxx | ELECTRONIC MUSICAL APPARATUS A | MIDI SESSION | ... |
| A(TARO) | xxx.xxx.xxx.xxx | PCA | VIDEO CHAT | ... |
| B(HANAKO) | xxx.xxx.xxx.xxx | ELECTRONIC MUSICAL APPARATUS B | MIDI SESSION | ... |
| B(HANAKO) | xxx.xxx.xxx.xxx | PCB | VIDEO CHAT | ... |
| : | : | : | : | : |

MUSIC SESSION SYSTEM, MUSIC SESSION SYSTEM SERVER, AND PROGRAM FOR IMPLEMENTING METHOD OF CONTROLLING THE SERVER

BACKGROUND OF THE INVENTION

1. Field of the Invention

The present invention relates to a music session system capable of performing a music session among a plurality of electronic musical apparatuses, a music session system server, and a program for implementing a method of controlling the server.

2. Description of the Related Art

Conventionally, there have been known music session systems which are capable of performing music sessions among a plurality of electronic musical apparatuses.

As an example of such music session systems, there is a music session system which enables each player of a music session to know whether or not other players are in a state of readiness to join the music session (see Japanese Laid-Open Patent Publication (Kokai) No. 2005-165078, for example).

The above conventional music session systems, however, can use only functions which the electronic musical apparatuses have (e.g. music session function) and cannot expand their functions.

SUMMARY OF THE INVENTION

It is an object of the present invention to provide a music session system, a music session system server, and a program for implementing a method of controlling the server, which make it possible to expand the functions of electronic musical apparatuses.

To attain the above object, in a first aspect of the present invention, there is provided a music session system server that is connected to a first electronic musical apparatus belonging to a first user and capable of executing music sessions, a first additional function executing apparatus belonging to the first user and capable of executing additional functions, a second electronic musical apparatus belonging to a second user and capable of executing music sessions, and a second additional function executing apparatus belonging to the second user and capable of executing additional functions via a network so as to perform transmission and reception of information, the music session system server comprising an instructing device operable when the first electronic musical apparatus requests the apparatuses belonging to the second user to execute a music session and an additional function, to instruct the first electronic musical apparatus and the second electronic musical apparatus to execute the music session and instruct the first additional function executing apparatus and the second additional function executing apparatus to execute the additional function.

With the arrangement of the music session system server according to the first aspect of the present invention, when the first electronic musical apparatus requests the apparatuses belonging to the second user to execute a music session and an additional function, the server instructs the first electronic musical apparatus and the second electronic musical apparatus to execute the music session and instructs the first additional function executing device and the second additional function executing apparatus to execute the additional function. Thus, additional functions can be added to the first electronic musical apparatus with ease.

Preferably, in instructing execution of a music session, the instructing device transmits information identifying an electronic musical apparatus with which the music session is to be executed and an instruction for executing the music session to each of the first electronic musical apparatus and the second electronic musical apparatus, and in instructing execution of an additional function, the instructing device transmits information identifying an additional function executing apparatus with which the additional function is to be executed and an instruction for executing the additional function to each of the first additional function executing apparatus and the second additional function executing apparatus.

With the arrangement of the preferred form of the music session system server according to the first aspect of the present invention, in instructing execution of a music session, the server transmits information identifying an electronic musical apparatus with which the music session is to be executed and an instruction for executing the music session to each of the first electronic musical apparatus and the second electronic musical apparatus, and in instructing execution of an additional function, the server transmits information identifying an additional function executing apparatus with which the additional function is to be executed and an instruction for executing the additional function to each of the first additional function executing apparatus and the second additional function executing apparatus. Since an apparatus with which an additional function is to be executed is also identified, the additional function can be in a state of readiness to be immediately executed.

More preferably, the music session system server according to the first aspect of the present invention, further comprises a user authenticating device that performs user authentication through at least a user ID in user information transmitted from each of the first and second electronic musical apparatuses and the first and second additional function executing apparatuses, and the instructing device identifies apparatuses with which a music session and an additional function are to be executed based on the user ID.

More preferably, each of an electronic musical apparatus and an additional function executing apparatus belonging to a user authenticated by the user authenticating device transmits a command including identification information identifying one of the electronic musical apparatus and the additional function executing apparatus and function information indicative of types of functions executable by one of the electronic musical apparatus and the additional function executing apparatus, and the instructing device instructs the identified apparatus to execute one of a music session and an additional function in accordance with the command.

Preferably, the music sessions includes a MIDI session and an audio data session.

Preferably, the additional functions include video chat, text chat, IP telephone, whiteboard, and electronic musical score.

To attain the above object, in a second aspect of the present invention, there is provided a music session system server that is connected to a first electronic musical apparatus belonging to a first user and capable of executing music sessions, a additional function executing apparatus belonging to the first user and capable of executing additional functions, and a second electronic musical apparatus belonging to a second user and capable of executing music sessions and additional functions via a network so as to perform transmission and reception of information, the music session system server comprising an instructing device operable when the first electronic musical apparatus requests the second electronic musical apparatus belonging to the second user to execute a music session and an additional function, to instruct the first electronic musical apparatus and the second electronic musical apparatus to execute the music session and instruct the additional function executing apparatus and the second electronic musical apparatus to execute the additional function.

With the arrangement of the music session system server according to the second aspect of the present invention, when the first electronic musical apparatus requests the second electronic musical apparatus belonging to the second user to execute a music session and an additional function, the server instructs the first electronic musical apparatus and the second electronic musical apparatus to execute the music session and instructs the additional function executing apparatus and the second electronic musical apparatus to execute the additional function. Thus, additional functions can be added to the first electronic musical apparatus with ease.

Preferably, in instructing execution of a music session, the instructing device transmits information identifying an electronic musical apparatus with which the music session is to be executed and an instruction for executing the music session to each of the first electronic musical apparatus and the second electronic musical apparatus, and in instructing execution of an additional function, the instructing device transmits information identifying an apparatus with which the additional function is to be executed and an instruction for executing the additional function to each of the additional function executing apparatus and the second additional function executing apparatus.

With the arrangement of the preferred form of the music session system server according to the second aspect of the present invention, in instructing execution of a music session, the server transmits information identifying an electronic musical apparatus with which the music session is to be executed and an instruction for executing the music session to each of the first electronic musical apparatus and the second electronic musical apparatus, and in instructing execution of an additional function, the server transmits information identifying an apparatus with which the additional function is to be executed and an instruction for executing the additional function to each of the additional function executing apparatus and the second additional function executing apparatus. Since an apparatus with which an additional function is to be executed is also identified, the additional function can be in a state of readiness to be immediately executed.

More preferably, the music session system server according to the second aspect of the present invention, further comprises a user authenticating device that performs user authentication through at least a user ID in user information transmitted from each of the first and second electronic musical apparatuses and the additional function executing apparatus, and the instructing device identifies apparatuses with which a music session and an additional function are to be executed based on the user ID.

More preferably, each of an electronic musical apparatus and an additional function executing apparatus belonging to a user authenticated by the user authenticating device transmits a command including identification information identifying one of the electronic musical apparatus and the additional function executing apparatus and function information indicative of types of functions executable by one of the electronic musical apparatus and the additional function executing apparatus, and the instructing device instructs the identified apparatus to execute one of a music session and an additional function in accordance with the command.

Preferably, the music sessions includes a MIDI session and an audio data session.

Preferably, the additional functions include video chat, text chat, IP telephone, whiteboard, and electronic musical score.

To attain the above object, in a third aspect of the present invention, there is provided a music session system comprising a first electronic musical apparatus belonging to a first user and capable of executing music sessions, and a first additional function executing apparatus belonging to the first user and capable of executing additional functions, a second electronic musical apparatus belonging to a second user and capable of executing music sessions, and a second additional function executing apparatus belonging to the second user and capable of executing additional functions, a music session system server connected to the first and second electronic musical apparatuses and the first and second additional function executing apparatuses via a network so as to perform transmission and reception of information, wherein the music session system server comprises an instructing device that is operable when the first electronic musical apparatus requests the apparatuses belonging to the second user to execute a music session and an additional function, to instruct the first electronic musical apparatus and the second electronic musical apparatus to execute the music session and instruct the first additional function executing apparatus and the second additional function executing apparatus to execute the additional function.

According to the third aspect of the present invention, the same effects as those obtained by the music session system server according to the first aspect of the present invention can be obtained.

To attain the above object, in a fourth aspect of the present invention, there is provided a music session system comprising a first electronic musical apparatus belonging to a first user and capable of executing music sessions and a additional function executing apparatus belonging to the first user and capable of executing additional functions, a second electronic musical apparatus belonging to a second user and capable of executing music sessions and additional functions; and a music session system server connected to the first and second electronic musical apparatuses and the additional function executing apparatus via a network so as to perform transmission and reception of information, wherein the music session system server comprises an instructing device that is operable when the first electronic musical apparatus requests the second electronic musical apparatus belonging to the second user to execute a music session and an additional function, to instruct the first electronic musical apparatus and the second electronic musical apparatus to execute the music session and instruct the additional function executing apparatus and the second electronic musical apparatus to execute the additional function.

According to the fourth aspect of the present invention, the same effects as those obtained by the music session system server according to the second aspect of the present invention can be obtained.

To attain the above object, in a fifth aspect of the present invention, there is provided a computer-readable medium including a program for causing a computer to execute a method of controlling a music session system server that is connected to a first electronic musical apparatus belonging to a first user and capable of executing music sessions, a first additional function executing apparatus belonging to the first user and capable of executing additional functions, a second electronic musical apparatus belonging to a second user and capable of executing music sessions, and a second additional function executing apparatus belonging to the second user and capable of executing additional functions via a network so as to perform transmission and reception of information, the method comprising a receiving step of receiving a request to execute a music session and an additional function, the request given by the first electronic musical apparatus to the apparatuses belonging to the second user, and an instructing step of, in response to the execution request received in the receiving step, instructing the first electronic musical apparatus and the second electronic musical apparatus to execute the music session and instruct the first additional function executing apparatus and the second additional function executing apparatus to execute the additional function.

According to the fifth aspect of the present invention, the same effects as those obtained by the music session system server according to the first aspect of the present invention can be obtained.

To attain the above object, in a sixth aspect of the present invention, there is provided a computer-readable medium including a program for causing a computer to execute a method of controlling a music session system server that is connected to a first electronic musical apparatus belonging to a first user and capable of executing music sessions, a additional function executing apparatus belonging to the first user and capable of executing additional functions, and a second electronic musical apparatus belonging to a second user and capable of executing music sessions and additional functions via a network so as to perform transmission and reception of information, the method comprising a receiving step of receiving a request to execute a music session and an additional function, the request given by the first electronic musical apparatus to the second electronic musical apparatus belonging to the second user, and an instructing step of, in response to the execution request received in the receiving step, instructing the first electronic musical apparatus and the second electronic musical apparatus to execute the music session and instruct the additional function executing apparatus and the second electronic musical apparatus to execute the additional function.

According to the sixth aspect of the present invention, the same effects as those obtained by the music session system server according to the second aspect of the present invention can be obtained.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
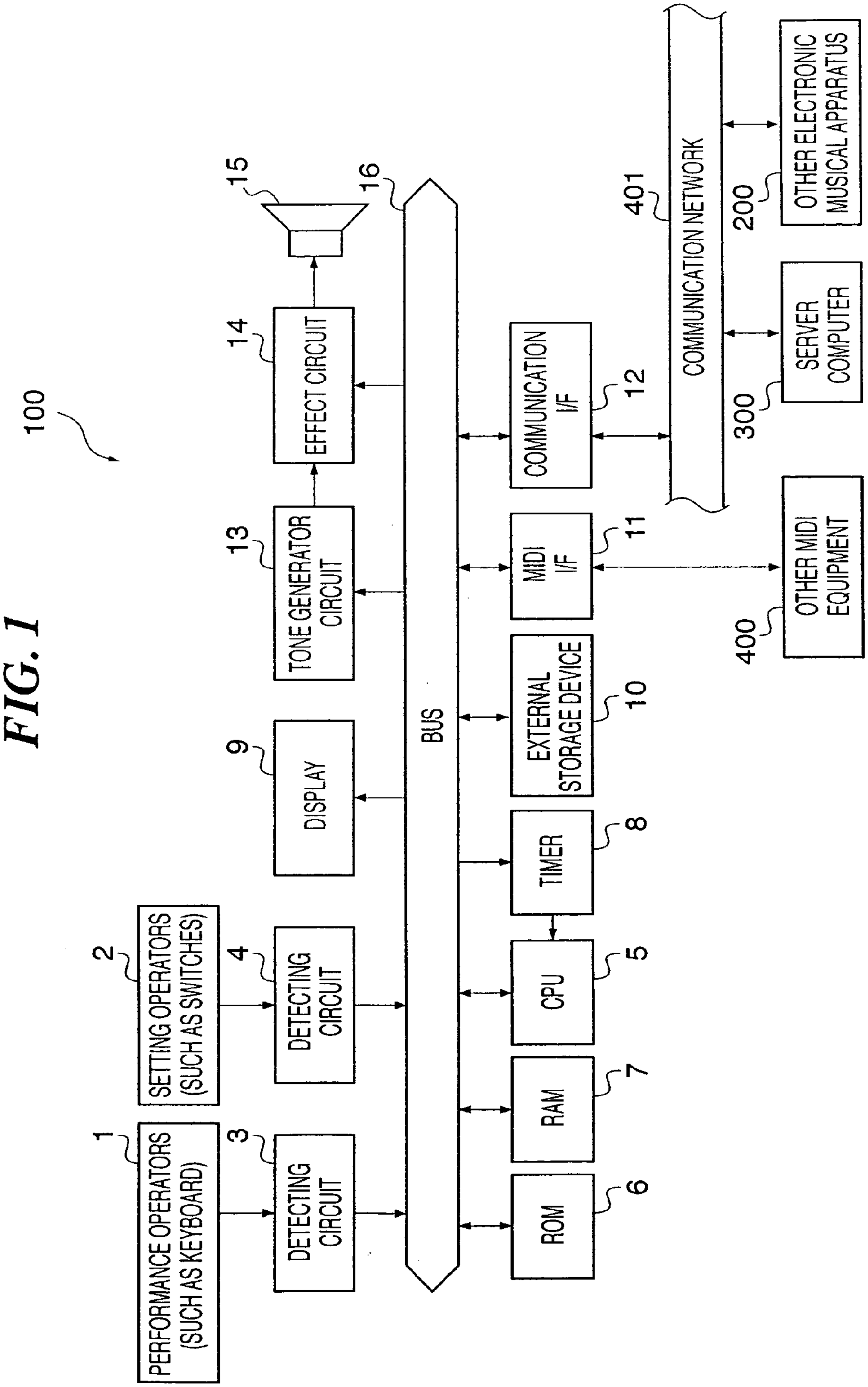
FIG. 1 is a block diagram schematically showing the construction of an electronic musical apparatus included in a music session system according to an embodiment of the present invention.

FIG. 1 is a block diagram schematically showing the construction of an electronic musical apparatus 100 included in a music session system according to an embodiment of the present invention.

As shown in FIG. 1, the electronic musical apparatus 100 is comprised of performance operators 1 including a keyboard for inputting pitch information; setting operators 2 including a plurality of switches for inputting various kinds of information; a detecting circuit 3 for detecting operative states of the performance operators 1; a detecting circuit 4 for detecting operative states of the setting operators 2; a CPU 5 that controls the entire apparatus; a ROM 6 that stores control programs executed by the CPU 5, various table data, etc.; a RAM 7 for temporarily storing performance data, various input information, computation results, etc.; a timer 8 that measures an interrupt time for timer interrupt processing and various kinds of time; a display 9 comprised of a small-sized liquid crystal display (LCD), light emitting diodes (LEDs), etc., for displaying various information and others; an external storage device 10 that stores various application programs including the control programs, various musical composition data, and various other data; a MIDI interface (I/F) 11 that inputs MIDI (Musical Instrument Digital Interface) messages from external devices and outputs MIDI message to external devices; a communication interface (I/F) 12 that performs transmission and reception of data to and from, for example, another electronic musical apparatus 200 and a server computer (hereinafter simply referred to as "the server") 300 via a communication network 401; a tone generator circuit 13 that converts performance data input by the performance operators 1, preset performance data, and other data into musical tone signals; an effect circuit 14 that applies various effects to musical tone signals from the tone generator circuit 13; and a sound system 15 that converts musical tone signals from the effect circuit 15 into sounds and is comprised of a DAC (Digital-to-Analog Converter), an amplifier, a speaker, etc.

The above component elements 3 to 14 are connected to one another via a bus 16. The timer 8 is connected to the CPU 5, other MIDI equipment 400 to the MIDI I/F 11, the communication network 401 to the communication I/F 12, the effect circuit 14 to the tone generator circuit 13, and the sound system 15 to the effect circuit 14.

Here, the communication I/F 12 and the communication network 401 should not necessarily be wired, but may be wireless. Alternatively, one may be wired and the other may be wireless The external storage device 10 may be implemented by, for example, a flexible disk drive (FDD), a hard disk drive (HDD), a CD-ROM drive, or a magneto-optical (MO) disk drive. The external storage device 10 may store the control programs executed by the CPU 5 as mentioned above. If one or more of the control programs are not stored in the ROM 6, the control program(s) may be stored in the external storage device 10, and by reading out the control program(s) from the external storage device 10 and storing the same in the RAM 7, the CPU 5 can operate in the same manner as if the control program(s) were stored in the ROM 6. This enables adding control programs and upgrading the version of the control programs with ease.

The MIDI I/F 11 need not be a dedicated one, but may be implemented by a universal interface such as RS-232C, USB (Universal Serial Bus), and IEEE1394. In this case, data other than MIDI message data may be transmitted and received simultaneously via the MIDI I/F 11.

As mentioned above, the communication I/F 12 is connected to the communication network 401 which may be a LAN (Local Area Network), the Internet, a telephone line, or the like, for connection to the server 300 via the communication network 401. When one or more of the above programs and various parameters are not stored in the external storage device 10, the communication I/F 12 is used to download such programs and parameters from the server 300. The electronic musical apparatus 100 as a client transmits a command or commands for downloading one or more programs and parameters to the server 300 via the communication I/F 12 and the communication network 401. In response to the command(s), the server 300 distributes the requested program(s) and parameters to the electronic musical apparatus 100 via the communication network 401, and the electronic musical apparatus 100 receives the program(s) and parameters via the communication I/F 12 and stores them in the external storage device 10, thus completing the download.

In the present embodiment, the server 300 is a management server that manages the electronic musical apparatus 100, other musical apparatus 200, etc. The server 300 will hereinafter be referred to as the management server 300. The management server 300 can be comprised of the same component elements as those of the electronic musical apparatus 100, but the performance operators 1, detecting circuit 3, and MIDI I/F 11 may be omitted because they are not essential elements. In general, a server computer is used as the management server 300.

Figure 2:
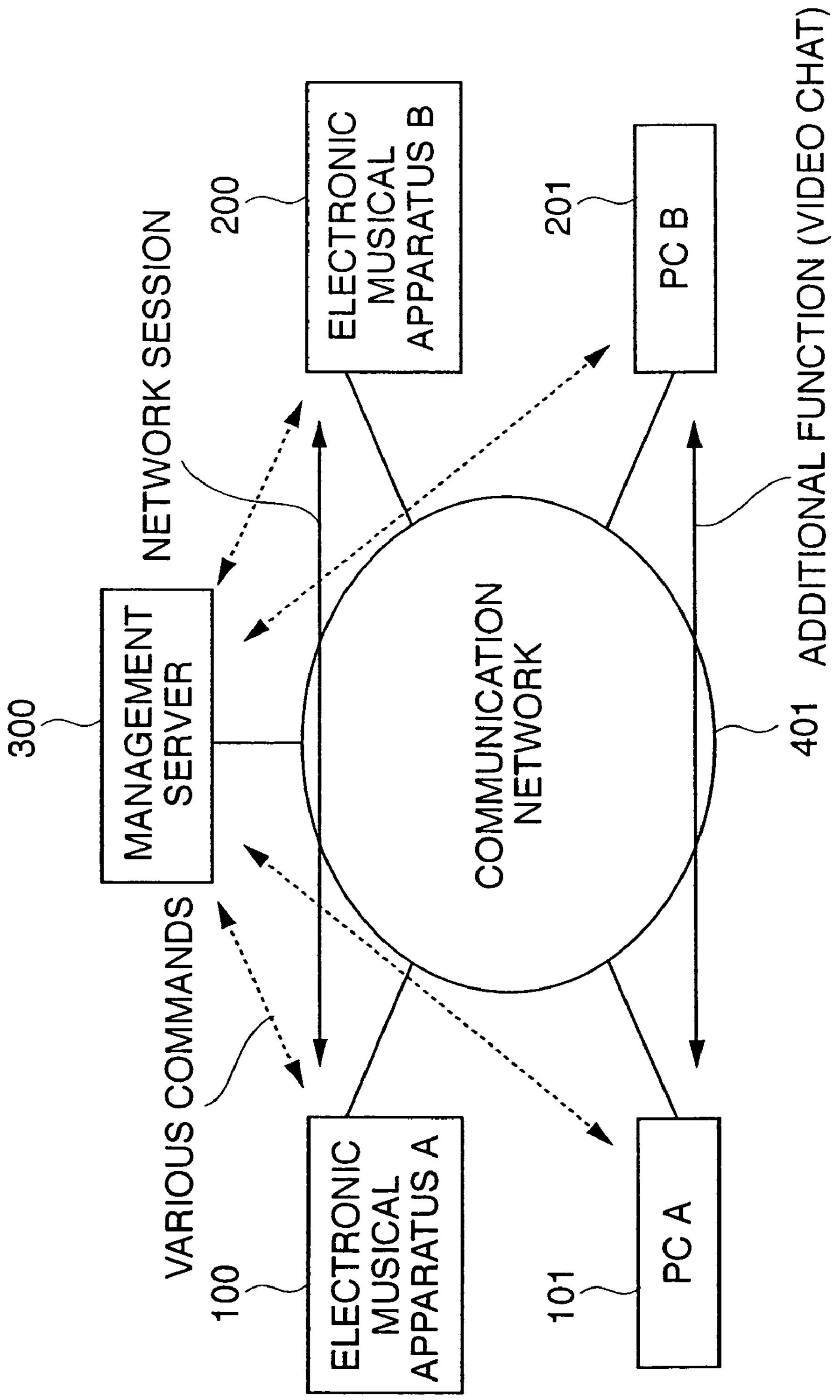
FIG. 2 is a view showing an example of the overall construction of the music session system according to the embodiment.

FIG. 2 is a block diagram showing the overall construction of the music session system according to the present embodiment.

As shown in FIG. 2, the music session system according to the present embodiment is comprised of the two electronic musical apparatuses 100 and 200, two personal computers (PCs) 101 and 201, and one management server 300. The component elements 100, 102, 200, 201, and 300 are connected to one another via the communication network 401.

The electronic musical apparatus 100 and the PC 101 are under the control of a user whose user ID is "A", e.g. "Taro", and the electronic musical apparatus 200 and the PC 201 are under the control of a user whose user ID is "B", e.g. "Hanako." The PCs 101 and 201 additionally execute functions that cannot be realized by the electronic musical apparatuses 100 and 200 (for example, video chat). Thus, Taro and Hanako can perform a network session (music session) using the electronic musical apparatuses 100 and 200 while doing a video chat using the PCs 101 and 201.

Examples of the electronic musical apparatuses 100 and 200 include an electronic musical instrument having a network communication function, and an electronic musical instrument connected to communication equipment having a network communication function. A network session (MIDI session) can be performed by exchanging, for example, MIDI messages between the electronic musical apparatuses 100 and 200 using the network communicating function.

As mentioned above, the PCs 101 and 201 are intended to add functions which the electronic musical apparatuses 100 and 200 do not have. The PCs 101 and 201 execute functions such as video chat using preinstalled application software.

A brief description will be given of control processes carried out by the music session system constructed as described above with reference to FIG. 2 first, and then a detailed description will be given of the control processes with reference to FIGS. 3 to 6.

The electronic musical apparatuses 100 and 200 and the PCs 101 and 201 perform transmission and reception of various commands (connected device list request command, device-to-device connection request command, alive command, communication start/stop command, etc.) to and from the management server 300. The electronic musical apparatuses 100 and 200 and the PCs 101 and 201 perform network sessions, video chats, etc. by bypassing the management server 300 after communication is established between them by transmitting and receiving various commands via the management server 300. One of the features of the present invention is that data exchanged between the apparatuses 100, 101, 200, and 201 and the management server 300 are only commands and not data themselves directly used in network sessions, video chats, etc. Another feature of the present invention is that functions which cannot be realized by the electronic musical apparatuses 100 and 200 are additionally executed on the PCs 101 and 201. Thus, the functions of the electronic musical apparatuses can be expanded.

A detailed description will now be given of this control process.

Figure 3:
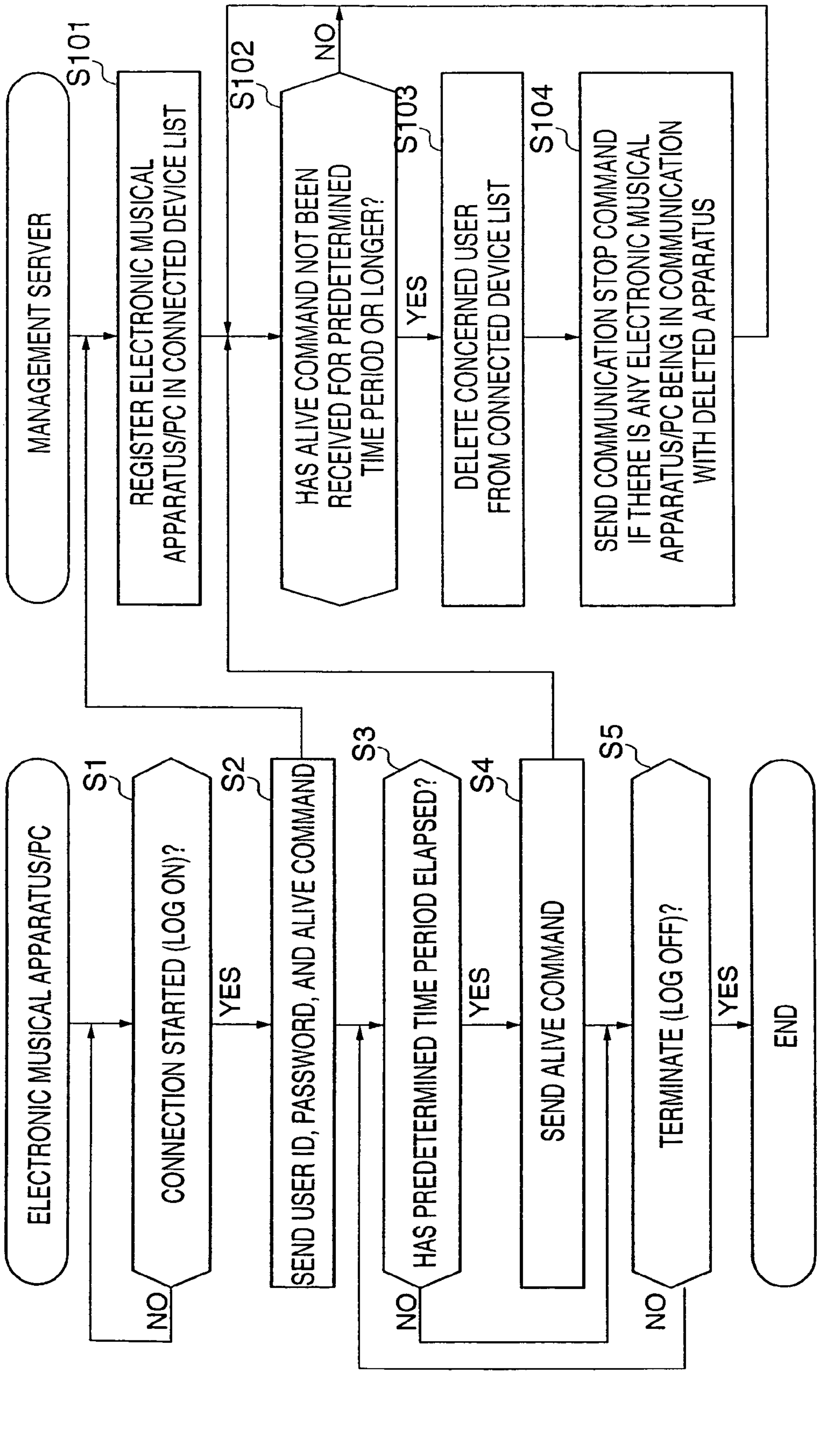
FIG. 3 is a flow chart showing the procedure of a control process carried out by an electronic musical apparatus/PC, which is included in the music session system according to the embodiment, and a management server between the instant when the electronic musical apparatus/PC starts logging on the management server and the instant when the electronic musical apparatus/PC logs off the management server.

FIG. 3 is a flow chart showing the procedure of the control process carried out by an electronic musical apparatus/PC, which is included in the music session system according to the present embodiment, and the management server 300 between the instant when the electronic musical apparatus/PC starts logging on to the management server 300 and the instant when the electronic musical apparatus/PC logs off from the management server 300.

As shown in FIG. 3, when the electronic musical apparatus/PC starts logging on to the management server 300, the electronic musical apparatus/PC transmits a user ID, a password, and an ALIVE command to the management server 300 (step S1→S2). The user ID and the password transmitted to the management server 300 are those which have been input by a user of the electronic musical apparatus/PC. Alternatively, the user ID and the password transmitted to the management server 300 may be those which have been registered in advance in the electronic musical apparatus/PC and read out. On the other hand, the ALIVE command transmitted to the management server 300 is one which has been automatically generated by the electronic musical apparatus/PC. The functions of the ALIVE command and various information included therein will be described later.

User information including user IDs and passwords with respect to users of music session services are registered in advance in the management server 300. Upon receiving the user ID, password, and ALIVE command transmitted from the electronic musical apparatus/PC, the management server 300 performs user authentication through the received user ID and password. When the user is successfully authenticated, the management server 300 registers the received user ID in a connected device list (step S101).

Figures 5A, 5B:
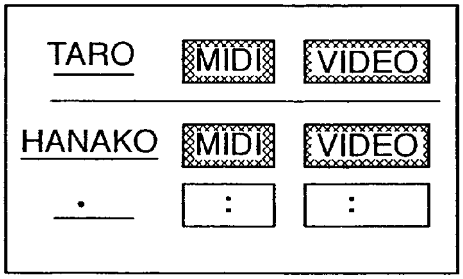
FIG. 5A is a view showing an example of a connected device list displayed on a display of an electronic musical apparatus which is under the control of Taro.
FIG. 5B is a view showing an example of the format of the connected device list in FIG. 5A.

FIG. 5B is a view showing an example of the format of the connected device list. As shown in FIG. 5B, the connected device list is configured so that user IDs, IP (Internet Protocol) addresses, a plurality of pieces of device information, etc. can be registered. Thus, the received user ID is registered at a corresponding position in the connected device list (in the illustrated example, at the top of registered items). It should be noted that the connected device list is stored in an area which is reserved, for example, at a predetermined location in a RAM, not shown, of the management server 300.

The management server 300 then analyzes the received ALIVE command. An ALIVE command is indicative of the fact that the device which has transmitted the ALIVE command is alive, and information on the device which has transmitted the ALIVE command, i.e. an IP address, a device type, and functions which the device has, etc. are embedded in the ALIVE command. Thus, by analyzing the received ALIVE command, the management server 300 can acquire device information embedded in the ALIVE command. The IP address, device type, functions of the device, etc. thus acquired are also registered at corresponding positions in the connected device list (step S101).

An ALIVE command is indicative of the fact that a device which has transmitted the ALIVE command is alive as mentioned above. The electronic musical apparatus/PC transmits such an ALIVE command to the management server 300 at regular time intervals (step S3→S4). Specifically, the management server 300 continuously checks whether or not the ALIVE command has been transmitted from the electronic musical apparatus/PC (step S102). If the ALIVE command has not been transmitted from the electronic musical apparatus/PC for a predetermined time period or longer, the management server 300 determines that the user has logged off the device that has transmitted the ALIVE command and then deletes information on the device from the connected device list (step S103).

If there is any electronic musical apparatus/PC being in communication with the device deleted from the connected device list, the management server 300 transmits a communication stop command to this electronic musical apparatus/PC (step S104). This electronic musical apparatus/PC is thus notified that the communication with the device at the other end has been terminated for reasons of the device's own.

Figure 4:
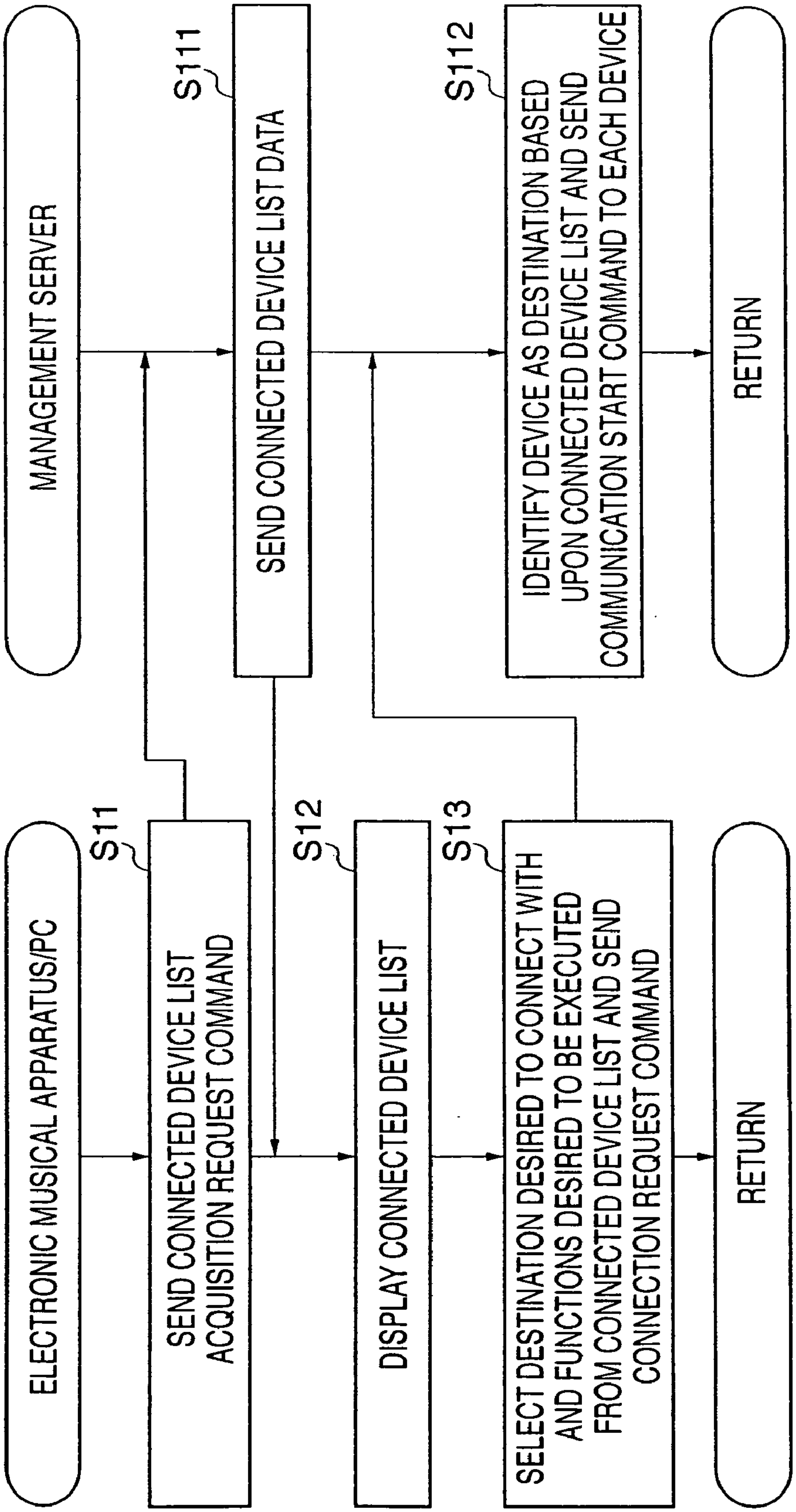
FIG. 4 is a flow chart showing the procedure of an identifying process in which a destination desired to connect with and a function desired to be executed are identified.

FIG. 4 is a flow chart showing the procedure of an identifying process in which a destination desired to connect with and functions desired to be executed are identified.

As described above with reference to FIG. 3, by referring to a connected device list, the management server 300 keeps track of positions on the communication network 401 and device information regarding electronic musical apparatuses/PCs which have logged on to the management server 300. Thus, when an electronic musical apparatus/PC intends to connect with another electronic musical apparatus/PC and execute its functions, the electronic musical apparatus/PC selects a destination to connect with and functions to be executed and then transmits a connection request to the management server 300. Responsive to this, the management server 300 identifies a device which is the requested destination from a connected device list and transmits a function execution start command to the identified device. The procedure of this process is described in a flow chart of FIG. 4.

As shown in FIG. 4, an electronic musical apparatus/PC transmits a connected device list acquisition request command to the management server 300 (step S11), and responsive to this, the management server 300 transmits connected device list data to the electronic musical apparatus/PC (step S111).

The electronic musical apparatus/PC displays a connected device list based on the received connected device list data (step S12).

FIG. 5A is a view showing an example of a connected device list displayed on the display 9 of the electronic musical apparatus 100 which is under the control of Taro. In the illustrated example, both Taro and Hanako have a MIDI session function and a video chat function (which are, however, additional functions executed by the PCs 101 and 201), and Taro requests Hanako to perform a MIDI session and a video chat. In FIG. 5A, among a plurality of function buttons, hatched buttons indicate the requested functions.

Next, when a user of the electronic musical apparatus/PC selects a destination to connect with and functions be used from the displayed connected device list, the electronic musical apparatus/PC transmits a connection request command including the destination and functions selected by the user to the management server 300 (step S13).

The management server 300 identifies a device which is the requested destination by referring to the connected device list and transmits a start command for executing the selected functions to the identified device (step S112).

Figure 6:
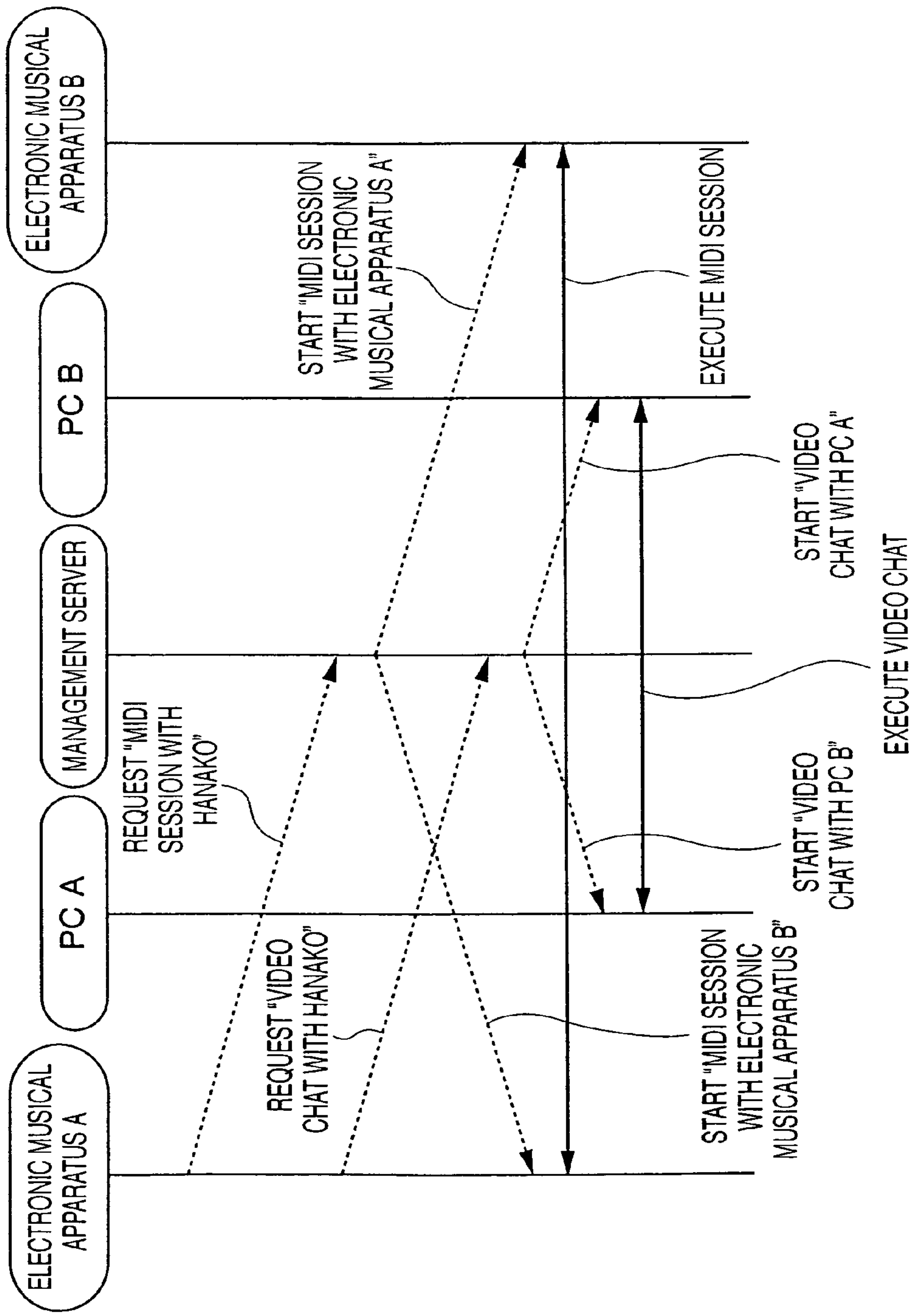
FIG. 6 is a diagram showing an example of how connection requests are transmitted from the electronic musical apparatus which is under the control of Taro to an electronic musical apparatus which is under the control of Hanako and start commands are transmitted from the management server in response to the requests.

FIG. 6 is a diagram showing an examples of how requests to connect with the electronic musical apparatus 200 which is under the control of Hanako are given by the electronic musical apparatus 100 which is under the control of Taro, and start commands are transmitted from the management server 300 in response to the requests.

As shown in FIG. 6, when, for example, the electronic musical apparatus 100 of which user ID is A (Taro) requests a "MIDI session+video chat with Hanako", the management server 300 transmits the following:

(1) Command indicative of "information (IP address) identifying the Hanako's electronic musical apparatus 200, a communication port, and an instruction for starting a MIDI session" to the Taro's electronic musical apparatus 100

(2) Command indicative of "information (IP address) identifying the Hanako's PC 201, a communication port, and an instruction for starting a video chat" to the Taro's PC 101

(3) Command indicative of "information (IP address) identifying the Taro's electronic musical apparatus 100, a communication port, and an instruction for starting a MIDI session" to the Hanako's electronic musical apparatus 200

(4) Command indicative of "information (IP address) identifying the Taro's PC 101, a communication port, and an instruction for starting a video chat" to the Hanako's PC 201.

It should be noted that communication ports are determined in advance with respect to respective communication functions (music session, video chat, etc.).

The devices which have received the above commands (1) to (4) execute the functions designated by these commands.

In the above described way, merely by giving requests from an electronic musical apparatus/PC to the management server 300, an additional device of its own (Taro's PC 101) and devices at the other end (Hanako's electronic musical apparatus 200 and PC 201) can be remote-controlled (i.e. the start of the execution of functions can be controlled).

Although in the present embodiment, a MIDI session is performed using electronic musical apparatuses and a video chat is performed using PCs, the present invention is not limited to this, but a device which is under the control of a certain user may perform both a MIDI session and a video chat. In this case, both a MIDI session start command and a video chat start command are transmitted to one device.

Also, although in the above description of the present embodiment, a MIDI session is given as an example of music session, this is only for the sake of convenience, and a music session may be an audio data session. Further, although in the above description of the present embodiment, the video chat function is given as an example of additional functions, the present invention is not limited to this, but any functions can be adopted insofar as they can be executed by a plurality of users via a network, such as text chat, voice chat, IP phone, whiteboard (common whiteboard that can be used for writing by a plurality of users), electronic musical score (musical score that can be displayed for a plurality of users), etc. Alternatively, information on devices which are under the control of other users may be displayed (for example, the status of an electronic musical device B may be displayed on a PC A), a device which is under the control of one's own may be caused to output sound from a device which is under the control of another user (for example, an electronic musical apparatus A and an electronic musical apparatus B may be connected to each other so that sound from the electronic musical apparatus B can be output via a speaker of the electronic musical apparatus A).

Further, a PC which executes additional functions may be comprised of a network analyzer (software) which exchanges information with the management server and additional function executing software (e.g. video chat application). Specifically, the network analyzer transmits requests and ALIVE commands to the management server and receives commands from the management server. Upon receiving a command, the network analyzer instructs the additional function executing software to execute additional functions. As a result of this, various kinds of universal software may be used as the additional function executing software, and the system can be constructed at lower cost.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A music session system server that is connected to a first electronic musical instrument belonging to a first user and capable of executing music sessions, a first additional function executing apparatus belonging to the first user and capable of executing additional functions, a second electronic musical instrument belonging to a second user and capable of executing music sessions, and a second additional function executing apparatus belonging to the second user and capable of executing additional functions via a network so as to perform transmission and reception of information, the music session system server comprising:

a first receiving device adapted to receive a command including apparatus-identifying information and apparatus information as to at least one of a music session and an additional function from each of said first electronic musical instrument, said first additional function executing apparatus, said second electronic musical instrument, and said second additional function executing apparatus;

a registering device adapted to register the received respective commands as a connected apparatus list;

a transmitting unit adapted to transmit the connected apparatus list to each of said first electronic musical instrument, said first additional function executing apparatus, said second electronic musical instrument, and said second additional function executing apparatus;

a second receiving device operable when the first electronic musical instrument requests the instrument and the apparatus belonging to the second user to execute a music session and an additional function, to receive, from the first electronic musical instrument, a command including the music session and the additional function selected from the connected apparatus list by the first electronic musical instrument; and an instructing device operable when the first electronic musical instrument requests the instrument and the apparatus belonging to the second user to execute a music session and an additional function, to instruct the first electronic musical instrument and the second electronic musical instrument to execute the music session included in the command received by the second receiving device and instruct the first additional function executing apparatus and the second additional function executing apparatus to execute the additional function included in the command received by the second receiving device, wherein data used by the music session is exchanged between the first and second electronic musical instruments through a music session communication connection through the network and bypasses the server, wherein data used by the additional function is exchanged between the first and second additional function executing apparatuses through an additional function communication connection through the network and bypasses the server, wherein the music session communication connection is separate from the additional function communication connection.

2. A music session system server according to claim 1, further comprising a user authenticating device that authenticates a user through at least a user ID in user information transmitted from each of the first and second electronic musical instruments and the first and second additional function executing apparatuses, and wherein said instructing device identifies intended apparatuses with which a music session and an additional function are to be executed based on the user ID.

3. A music session system server according to claim 1, wherein the music session includes one of a MIDI session and an audio data session.

4. A music session system server according to claim 1, wherein the additional function includes one of a video chat, text chat, IP telephone, whiteboard, and electronic musical score.

5. A music session system server that is connected to a first electronic musical instrument belonging to a first user and capable of executing music sessions, an additional function executing apparatus belonging to the first user and capable of executing additional functions, and a second electronic musical instrument belonging to a second user and capable of executing music sessions and additional functions via a network so as to perform transmission and reception of information, the music session system server comprising:

a first receiving device adapted to receive a command including apparatus-identifying information and apparatus information as to at least one of a music session and an additional function from each of said first electronic musical instrument, said additional function executing apparatus and said second electronic musical instrument;

a registering device adapted to register the received respective commands as a connected apparatus list;

a transmitting unit adapted to transmit the connected apparatus list to each of said first electronic musical instrument, said additional function executing apparatus and said second electronic musical instrument;

a second receiving device operable when the first electronic musical instrument requests the second electronic musical instrument belonging to the second user to execute a music session and an additional function, to receive, from the first electronic musical instrument, a command including the music session and the additional function selected from the connected apparatus list by the first electronic musical instrument; and an instructing device operable when the first electronic musical instrument requests the second electronic musical instrument belonging to the second user to execute a music session and an additional function, to instruct the first electronic musical instrument and the second electronic musical instrument to execute the music session included in the command received by the second receiving device and instruct the additional function executing apparatus and the second electronic musical instrument to execute the additional function included in the command received by the second receiving device, wherein data used by the music session is exchanged between the first and second electronic musical instruments through a music session communication connection through the network and bypasses the server, wherein data used by the additional function is exchanged between the additional function executing apparatus and the second electronic musical instrument through an additional function communication connection through the network and bypasses the server, wherein the music session communication connection is separate from the additional function communication connection.

6. A music session system server according to claim 5, further comprising a user authenticating device that authenticates a user through at least a user ID in user information transmitted from each of the first and second electronic musical instruments and the additional function executing apparatus, and wherein said instructing device identifies intended apparatuses with which a music session and an additional function are to be executed based on the user ID.

7. A music session system server according to claim 5, wherein the music session includes one of a MIDI session and an audio data session.

8. A music session system server according to claim 5, wherein the additional function includes one of a video chat, text chat, IP telephone, whiteboard, and electronic musical score.

9. A music session system comprising:

a first electronic musical instrument belonging to a first user and capable of executing music sessions, and a first additional function executing apparatus belonging to the first user and capable of executing additional functions;

a second electronic musical instrument belonging to a second user and capable of executing music sessions, and a second additional function executing apparatus belonging to the second user and capable of executing additional functions;

a music session system server connected to said first and second electronic musical instruments and said first and second additional function executing apparatuses via a network so as to perform transmission and reception of information, wherein said music session system server comprises a first receiving device adapted to receive a command including apparatus-identifying information and apparatus information as to at least one of a music session and an additional function from each of said first electronic musical instrument, said first additional function executing apparatus, said second electronic musical instrument, and said second additional function executing apparatus;

a registering device adapted to register the received respective commands as a connected apparatus list;

a transmitting unit adapted to transmit the connected apparatus list to each of said first electronic musical instrument, said first additional function executing apparatus, said second electronic musical instrument, and said second additional function executing apparatus;

a second receiving device operable when the first electronic musical instrument requests the instrument and the apparatus belonging to the second user to execute a music session and an additional function, to receive, from the first electronic musical instrument, a command including the music session and the additional function selected from the connected apparatus list by the first electronic musical instrument; and an instructing device that is operable when said first electronic musical instrument requests said instrument and the apparatus belonging to the second user to execute a music session and an additional function, to instruct said first electronic musical instrument and said second electronic musical instrument to execute the music session included in the command received by the second receiving device and instruct said first additional function executing apparatus and said second additional function executing apparatus to execute the additional function included in the command received by the second receiving device, wherein data used by the music session is exchanged between the first and second electronic musical instruments through a music session communication connection through the network and bypasses the server, wherein data used by the additional function is exchanged between the first and second additional function executing apparatuses through an additional function communication connection through the network and bypasses the server, wherein the music session communication connection is separate from the additional function communication connection.

10. A music session system comprising:

a first electronic musical instrument belonging to a first user and capable of executing music sessions and an additional function executing apparatus belonging to the first user and capable of executing additional functions;

a second electronic musical instrument belonging to a second user and capable of executing music sessions and additional functions; and a music session system server connected to said first and second electronic musical instruments and said additional function executing apparatus via a network so as to perform transmission and reception of information, wherein said music session system server comprises a first receiving device adapted to receive a command including apparatus-identifying information and apparatus information as to at least one of a music session and an additional function from each of said first electronic musical instrument, said additional function executing apparatus and said second electronic musical instrument;

a registering device adapted to register the received respective commands as a connected apparatus list;

a transmitting unit adapted to transmit the connected apparatus list to each of said first electronic musical instrument, said additional function executing apparatus and said second electronic musical instrument;

a second receiving device operable when the first electronic musical instrument requests the second electronic musical instrument belonging to the second user to execute a music session and an additional function, to receive, from the first electronic musical instrument, a command including the music session and the additional function selected from the connected apparatus list by the first electronic musical instrument; and an instructing device that is operable when said first electronic musical instrument requests said second electronic musical instrument belonging to the second user to execute a music session and an additional function, to instruct said first electronic musical instrument and said second electronic musical instrument to execute the music session included in the command received by the second receiving device and instruct said additional function executing apparatus and said second electronic musical instrument to execute the additional function included in the command received by the second receiving device, wherein data used by the music session is exchanged between the first and second electronic musical instruments through a music session communication connection through the network and bypasses the server, wherein data used by the additional function is exchanged between the additional function executing apparatus and the second electronic musical instrument through an additional function communication connection through the network and bypasses the server, wherein the music session communication connection is separate from the additional function communication connection.

11. A computer-readable medium including a program for causing a computer to execute a method of controlling a music session system server that is connected to a first electronic musical instrument belonging to a first user and capable of executing music sessions, a first additional function executing apparatus belonging to the first user and capable of executing additional functions, a second electronic musical instrument belonging to a second user and capable of executing music sessions, and a second additional function executing apparatus belonging to the second user and capable of executing additional functions via a network so as to perform transmission and reception of information, the method comprising:

a first step of receiving a command including apparatus-identifying information and apparatus information as to at least one of a music session and an additional function from each of said first electronic musical instrument, said first additional function executing apparatus, said second electronic musical instrument, and said second additional function executing apparatus;

registering the received respective commands as a connected apparatus list;

transmitting the connected apparatus list to each of said first electronic musical instrument, said first additional function executing apparatus, said second electronic musical instrument, and said second additional function executing apparatus;

a second step, when the first electronic musical instrument requests the instrument and the apparatus belonging to the second user to execute a music session and an additional function, of receiving, from the first electronic musical instrument, a command including the music session and the additional function selected from the connected apparatus list by the first electronic musical instrument; and in response to the execution request received in said second receiving step, instructing the first electronic musical instrument and the second electronic musical instrument to execute the music session included in the command received in the second receiving step and instructing the first additional function executing apparatus and the second additional function executing apparatus to execute the additional function included in the command received in the second receiving step, wherein data used by the music session is exchanged between the first and second electronic musical instruments through a music session communication connection through the network and bypasses the server, wherein data used by the additional function is exchanged between the first and second additional function executing apparatuses through an additional function communication connection through the network and bypasses the server, wherein the music session communication connection is separate from the additional function communication connection.

12. A computer-readable medium including a program for causing a computer to execute a method of controlling a music session system server that is connected to a first electronic musical instrument belonging to a first user and capable of executing music sessions, an additional function executing apparatus belonging to the first user and capable of executing additional functions, and a second electronic musical instrument belonging to a second user and capable of executing music sessions and additional functions via a network so as to perform transmission and reception of information, the method comprising:

a first step of receiving a command including apparatus-identifying information and apparatus information as to at least one of a music session and an additional function from each of said first electronic musical instrument, said additional function executing apparatus and said second electronic musical instrument;

registering the received respective commands as a connected apparatus list;

transmitting the connected apparatus list to each of said first electronic musical instrument, said additional function executing apparatus and said second electronic musical instrument;

a second step, when the first electronic musical instrument requests the second electronic musical instrument belonging to the second user to execute a music session and an additional function, of receiving, from the first electronic musical instrument, a command including the music session and the additional function selected from the connected apparatus list by the first electronic musical instrument; and in response to the execution request received in said second receiving step, instructing the first electronic musical instrument and the second electronic musical instrument to execute the music session included in the command received by the second receiving step and instructing the additional function executing apparatus and the second electronic musical instrument to execute the additional function included in the command received by the second receiving step, wherein data used by the music session is exchanged between the first and second electronic musical instruments through a music session communication connection through the network and bypasses the server, wherein data used by the additional function is exchanged between the additional function executing apparatus and the second electronic musical instrument through an additional function communication connection through the network and bypasses the server, wherein the music session communication connection is separate from the additional function communication connection.

* * * * *